United States Patent
Glickman

(10) Patent No.: US 12,118,180 B2
(45) Date of Patent: Oct. 15, 2024

(54) COMPUTING DEVICE WITH AN APPROPRIATE ADAPTABLE USER HARDWARE INTERFACE

(71) Applicant: Jonathan Glickman, Needham, MA (US)

(72) Inventor: Jonathan Glickman, Needham, MA (US)

( * ) Notice: Subject to any disclaimer, the term of this patent is extended or adjusted under 35 U.S.C. 154(b) by 0 days.

(21) Appl. No.: 16/845,827

(22) Filed: Apr. 10, 2020

(65) Prior Publication Data

US 2020/0310605 A1 Oct. 1, 2020

Related U.S. Application Data

(63) Continuation of application No. 15/917,162, filed on Mar. 9, 2018, now Pat. No. 10,620,792.

(60) Provisional application No. 62/469,890, filed on Mar. 10, 2017.

(51) Int. Cl.
| | | |
|---|---|---|
| *G06F 3/0482* | (2013.01) | |
| *G06F 3/02* | (2006.01) | |
| *G06F 3/023* | (2006.01) | |
| *G06F 3/038* | (2013.01) | |
| *G06F 3/0488* | (2022.01) | |

(52) U.S. Cl.
CPC .......... *G06F 3/0482* (2013.01); *G06F 3/0202* (2013.01); *G06F 3/023* (2013.01); *G06F 3/038* (2013.01); *G06F 3/0488* (2013.01); *G06F 2203/0383* (2013.01); *G06F 2203/0384* (2013.01)

(58) Field of Classification Search
CPC ...... G06F 3/0482; G06F 3/0202; G06F 3/038; G06F 3/023; G06F 2203/0384; G06F 2203/0383; G06F 3/0488
See application file for complete search history.

(56) References Cited

U.S. PATENT DOCUMENTS

| | | | |
|---|---|---|---|
| 9,135,203 B2 | 9/2015 | Glickman | |
| 9,699,291 B2 | 7/2017 | Zhao et al. | |
| 10,620,792 B2 | 4/2020 | Glickman | |
| 2006/0053388 A1* | 3/2006 | Michelman | G06F 9/451 |
| | | | 715/779 |
| 2015/0113181 A1* | 4/2015 | Law | G06F 13/20 |
| | | | 710/38 |
| 2016/0085439 A1* | 3/2016 | Threlkeld | G06F 3/033 |
| | | | 715/740 |
| 2016/0366272 A1* | 12/2016 | Pu | G06F 3/0426 |
| 2018/0260083 A1 | 9/2018 | Glickman | |
| 2020/0374954 A1 | 11/2020 | Chen et al. | |

* cited by examiner

*Primary Examiner* — Andrey Belousov
(74) *Attorney, Agent, or Firm* — Fish & Richardson P.C.

(57) ABSTRACT

A computing device includes at least one processor. The computing device also includes a memory, wherein the memory includes instructions that causes the at least one processor to perform operations. The operations include detecting at least one device connected to the computing device, selecting a user interface based on the at least one device; and displaying the user interface on a display associated with the computing device.

15 Claims, 7 Drawing Sheets

COMPUTING DEVICE WITH AN APPROPRIATE ADAPTABLE USER HARDWARE INTERFACE

CROSS-REFERENCE TO RELATED APPLICATIONS

This application claims priority under 35 U.S.C. § 120 to U.S. application Ser. No. 15/917,162 filed Mar. 9, 2018, which claims priority under 35 U.S.C. § 119(e)(1) to U.S. Provisional Application No. 62/469,890 filed Mar. 10, 2017. The contents of these applications are hereby incorporated by reference in their entirety.

BACKGROUND

Various types of interfaces can be employed to allow individuals to exchange information with computing devices. Visual techniques (using displays, touchscreens, etc.), audible techniques (using microphones, speakers, etc.), tactile techniques (using keyboards, stylists, etc.) can assist with the exchange of information between the devices and users. The particular type of computing device used by the individual can also affect the interface, interfacing techniques employed, etc. For example, some types of computing devices (e.g., desktop computer systems) may provide an interface that is considerable richer compared to other devices (e.g., Smartphones).

SUMMARY OF THE INVENTION

In general, one innovative aspect of the subject matter described in this specification can be embodied in methods that include the act of detecting at least one device connected to the computing device. The method includes the act of selecting a user interface based on the at least one device. The method also includes the act of displaying the user interface on a display associated with the computing device.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The user interface can be selected from a plurality of different user interfaces. The plurality of different user interfaces may include at least a PDA type user interface, and a workstation type user interface. The detecting and selecting can be performed by an appropriate adaptive user interface display manager. The at least one device may be at least one of a mouse, a pointing input device, a monitor, a projector, a television, a monitor type device, a keyboard device, a game controller, and an input device. Selecting the user interface may include the act of accessing the data store, the data store storing records identifying devices and corresponding user interfaces; and wherein selecting

DETAILED DESCRIPTION

Figure 1:
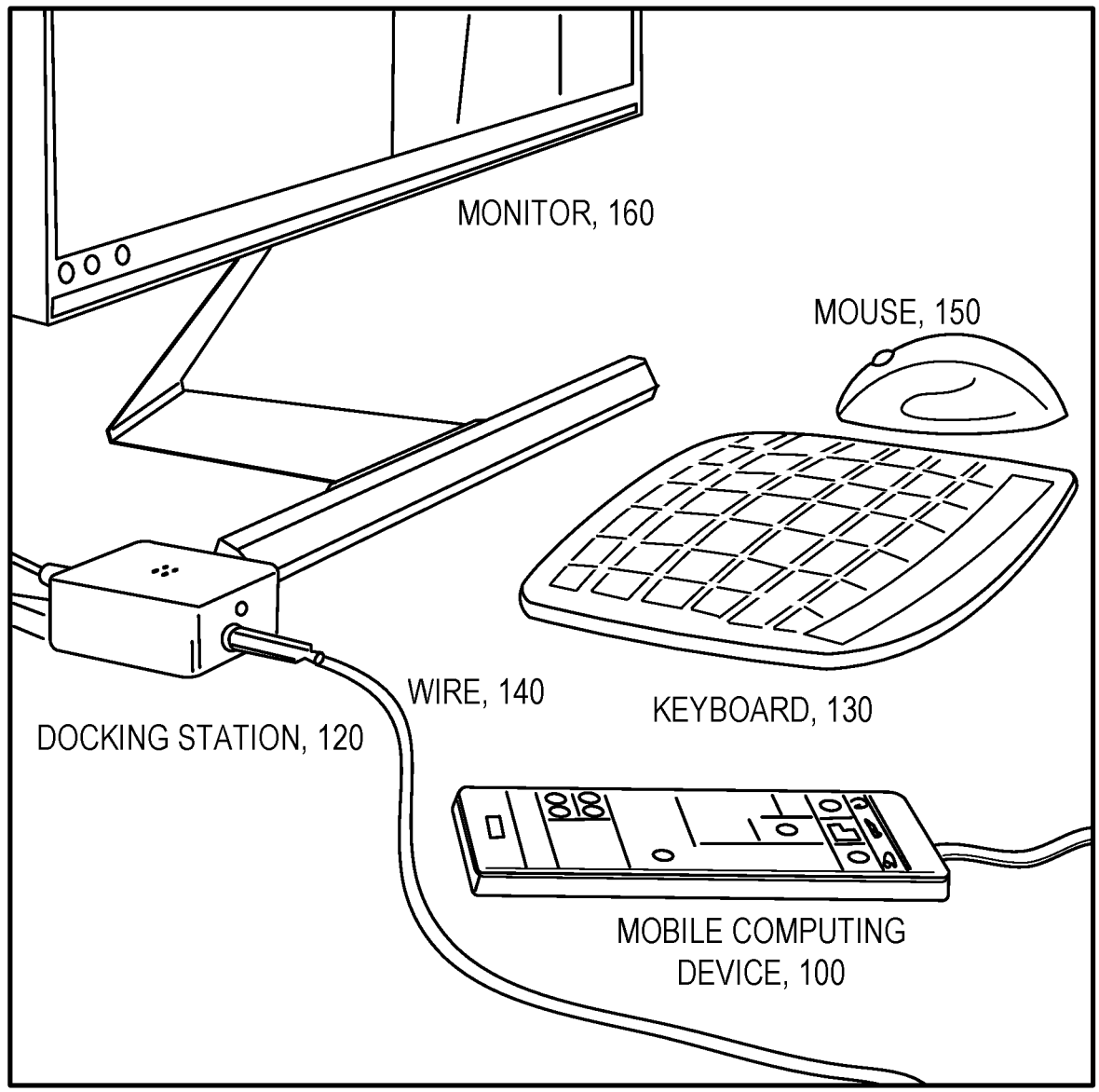
FIG. 1 illustrates an example mobile device interacting with a keyboard, mouse and monitor.

A multi-purpose computing device is capable of running a full featured Operating System (OS) that uses an Appropriate Adaptable User Interface (AAUI) to act as a Smartphone, Laptop, and Workstation/Server. The computing device can dynamically adapt its user interface (UI) based on its usage. In general, computing devices can be either mobile or stationary and accompanied by one or more UI's that is either mobile or stationary but usually not both. Whereas this disclosure describes a multi-purpose computing device that runs a full featured Workstation/Server OS or a more robust version of a typical embedded OS that is flexible enough that when it is used as a mobile device employs a typical touchscreen Smartphone UI Personal Digital Assistant (PDA) Window Manager interface then when used as a Workstation its UI is indistinguishable from the typical monitor, mouse and keyboard Workstation/Server Window Manager UI.

Computing devices can have user interfaces (UI) that can be classified as mobile, stationary or a combination of thereof. The mobile computing device tends to naturally use a PDA touchscreen interface that is more typically found on Smartphone and tablets that usually employ embedded type OS and its functionality is self-contained meaning that it was intended to operate without any supporting devices. Whereas a stationary device is akin to a Laptop, Workstation, Server including HPC cluster that naturally employs a full featured Server type OS that relies on supporting devices such as separate monitor, mouse and keyboard Workstation Window Manager UI.

As used herein the term Presentation Layer refers to the interface between the user and the device which applications interact with. The Presentation Layer can include a set of GUIs that can be managed by a collection of Window Managers. The Window Managers can be cataloged by a computing device, be it mobile or stationary, to be used with a suite of optional auxiliary devices. The Appropriate Adaptable User Interface (AAUI) can employ different Window Managers dynamically to adapt to the environment, however in some implementations, the AAUI doesn't have to rely on separate Window Managers rather the AAUI can also exist as a Window Manager that can change its appearance to suite the environment and the devices it interacts with but appear to be a separate Window Manager to the user.

The use of a full versioned Operating System (OS) or robust Embedded OS allows for Virtualized Machines (VM) and/or Hypervisors to be employed as a method to access by the AAUI. In general, a VM is an emulation of a computer system. VMs general include system virtual machines which provide a substitute for a real machine and provide functionality to operate an entire operating system. VMs may also include process virtual machines designed to execute computer programs in a platform-independent environment. A Hypervisor is a VM that uses native execution to share and manage hardware, allowing for multiple environments which are isolated from one another, yet exist on the same physical machine.

The use of the Appropriate Adaptable User Interface (AAUI) can be employed whether it be by switching a VM or as a functioning layer in the OS. The Appropriate Adaptable User Interface (AAUI) can be completely seamless UI as far as the user is concerned, meaning it presents a Smartphone touchscreen PDA type UI when it is used as a Smartphone and presents a Workstation UI when used as a Laptop, Workstation/Server that is accompanied by a pointing device, optional separate monitor and keyboard or facsimile thereof. Appropriate Adaptable User Interface (AAUI) also allows for a PDA mobile interface to be augmented by a keyboard and pointing device without changing the nature of the interface while still retaining its PDA interface characteristics.

As the multi-purpose computing device can assist a consumer by allowing the use of a single device and thereby reducing the incentive to buy many devices with different user interfaces. The term Adaptable User Interface (AUI) can refer to UI that needs to adapt to the changing content and use of the device. There are now frameworks that attempt to have a universal presentation layer but the mobile computing device still only can display a PDA App UI and requires that other devices running full Workstation OSs to function with a Workstation UI. The disclosure described here intends to employ the appropriate Window Manager for the appropriate use of the multi-purpose computing device and what it communicates with whether it is being used as a mobile or stationary. When the multi-purpose computing device is used as a singular smartphone in a portable situation its presentation layer appropriately displays the typical App PDA UI Window Manager. However when the multi-purpose computing device interfaces with a keyboard, monitor and optional docking station its presentation layer utilizes a fully typical stationary Workstation Application UI window manager. A singular multi-purpose computing device that can be mobile or stationary can utilize the processing power of the Smartphone, docking station, entertainment center, enhanced cable box, medical and industrial device and even a car so it doesn't have to duplicate expensive components to function thus reducing its footprint and cost. The AAUI (Appropriate Adaptable User Interface) deployed on a fully functional Workstation or Server OS or enhanced Embedded OS doesn't try to utilize a single scalable UI one size fits all presentation for all its UI rather it appropriately switches Window Managers AUI to what the user is accustomed to using when natively using the a input/output particular device. When an AAUI is employed on a mobile computing device its user interface acts like a Smartphone however when used with a keyboard, monitor and pointing device as a stationary device its AAUI switches its UI seamlessly to work natively like a Workstation.

A mobile multi-purpose computing device that has a full featured OS like Linux, UNIX, Windows or macOS or facsimile instead of the typical scaled down embedded OS thereof that can natively adapt its AAUI to accompany its usage dynamically from as a Smartphone, a cable box, a TiVo, Gaming Console/Controller, Virtual Reality (VR) and Holographic Augmented Reality devices to a full Workstation would dramatically be more affordable that buying separate devices for each role. An OS that employs the use of the AAUI can function either as a mobile or stationary device and adapt its user interface to what is natural for that deployment. When the AAUI is employed on a typical Smartphone enhanced Embedded OS the use of emulators, decompiling, recompiling, or porting would be required to run full Workstation applications and the same would be true on a full featured OS running Smartphones apps. Finally one device can play the role of any electronic computing device seamlessly by virtue of its AAUI (Appropriate Adaptable User Interface).

Smartphones are now powerful enough to run full featured workstation type of OS versions such as UNIX, Linux, Windows and macOS. Having an AAUI that can transform from a PDA Smartphone UI to a desktop UI with a keyboard, monitor and various forms of docking stations would allow for greater flexibility than any competing technology currently on the market. Instead of putting Workstation user interface features like a start button on PDA tablet type device, Smartphones now are powerful enough to have a full featured Workstation/Server OS with Workstation applications installed that can dynamically switch from an array of user interface options depending on its use. Many of the Smartphone vendors now have Smartphone kits that can run a full version of Linux and make this disclosure possible today by virtue of extending its UI capabilities. A mobile computing device that can run a full versioned OS that utilizes an AAUI (Appropriate Adaptable User Interface) can replace the need for multiple computing devices.

With multiple types of user interfaces available, users have adopted Smartphone, tablet, Laptop, gaming system, cable box, IoT and other specialized UI having to specifically adjust to each. This disclosure describes a multi-purpose computing device that is capable of running an AAUI that can be Smartphone PDA, Laptop, Workstation or Server UI that dynamically adapts to it usage appropriately. Whereas some vendors have augmented their PDA tablet embedded OSs by adding some user interface features of their regular OS, disclosure multi-purpose computing device is capable of running the regular Workstation or Server OS and its native applications that has a flexible UI that can dynamically range from a Smartphone to a full Server window managers appropriately. A multi-purpose computing device that can run a full version of an Workstation type OS and install applications that can be accessed by an AAUI not only saves costs by extending functionality by having full featured seamless desktop functionality typical of a Laptop or Workstation is also mobile enough to use as a tablet or Smartphone. Having one device that can serve as a Smartphone and a Workstation and can have an application accessible by a flexible AAUI dramatically increases usage, portability and flexibility.

There are all kinds of computing devices mobile and stationary that the AAUI can be applied to such as a cable box, gaming and VR and Holographic Augmented Reality devices, IoT devices, medical devices, robotics and industrial devices and even cars that can be accessed with a mobile PDA UI as well as being used as a typical Workstation UI. Multi-purpose computing devices can also use the AAUI to employ a game controller/console interface that have the ability to switch to mobile PDA UI and the Workstation UI when accompanied by the proper adjacent devices. Now that automobiles are becoming driverless the opportunity to utilize the AAUI can be used to augment the mobile PDA interface typically found on the dashboard with the Workstation UI for diagnostics, repairs or as a mobile personal Server. Medical devices can also employ the AAUI to interface with the user either with the mobile PDA UI, the Workstation Server UI, the audible type UI and other appropriately deemed UI. Industrial computing devices and Robotics also are a candidate for the AAUI that can interface with the user either with the mobile PDA UI, the Workstation Server UI, and the audible artificial intelligence (AI) type UI and other appropriately deemed UI. IoT computing devices also are a candidate for the AAUI and can interface with the user either with the mobile PDA UI, the Workstation Server UI, and the audible AI type UI and other appropriately deemed UI. Soon wristwatches and other wearables that utilize the AAUI can act seamlessly with the user as a mobile computing device through the PDA UI and as a Workstation UI when accompanied by the typical pointing device and keyboard Workstation interface or by the audible UI and even the gaming UI. All these purchases duplicate investment when it is now possible that one device can adapt to almost any type of use by virtue of the AAUI depending on how it is used and what devices it communicates with. One device would be capable of replacing all other consumer computing devices essentially being the only device the consumer needs for most practical use cases.

Attempts in Web design have strived to consolidate the appearance of the web page with a Contextual User Interface regardless of whether the computing device is a PDA or server in a consistent appearance with limited success. Contextual User Experience (UX) attempts to adjust coherence while synchronizing the consistency of the GUI when it's being used by a PDA or workstation. It would be more natural for a Presentation Layer that can still be contextual without having to sacrifice the native instinctual interaction or natural presentation of the PDA or workstation computing device. A Presentation Layer that is capable of interacting natively as a PDA GUI when it is used with a touchscreen and has the ability to seamlessly switch to a workstation GUI when it is used with external keyboard, mouse and video devices would be an example of the AAUI capability. There are attempts on the market to take a mobile computing device and dock into a docking station, however they display essentially the same basic mobile computing PDA user interface on a monitor and cannot run regular workstation applications and mobile computing device apps. The AAUI is different for it goes beyond having mobile computing devices interfacing with a keyboard, mouse and monitor. The AAUI actually combines the devices user interfaces and user programs into one device seamlessly.

A computing device that can run a full version of a Workstation type OS or that can be accessed by an AAUI not only saves costs but extends functionality. Having one device that can serve as a Smartphone and a Workstation that can have an application accessible by a flexible user interface dramatically increases usage, portability and flexibility. The mobile computing device disclosure also would be able to install PDA apps, gaming software, Workstation software natively due to its dynamically seamless AAUI. Emulator libraries that allow for software of the supporting devices to be run on the mobile computing device disclosure further extend its adaptability. There are APK toolkits for dissembling, recompiling, decompiling and so on to install apps in various mobile computing environments as well as tools that allow Android Application Package (APK) android mobile apps to be installed on multiple environments natively by virtue of the App manifest configuration file and similar toolsets exist for other popular mobile computing environments. All these purchases duplicate investment when it is now possible to conceive that one device can adapt to almost any interface. One device would be able to replace all other consumer computing device essentially being only device the consumer needs for most practical use cases.

Reference will now be made in detail to the various implementations, examples of which are illustrated in the accompanying figures, wherein like reference numerals refer to the like elements throughout the several views. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the invention. The terms used to specify the presence of stated elements, steps, operations, and/or components, but do not preclude the presence or substitution of like items or addition of one or more other elements, steps, operations, and/or components. The terms "first", "second, and the like may be used to describe various elements, but do not limit the elements. Such terms are only used to distinguish one element from another. The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale. These and/or other aspects become apparent and are more readily appreciated by those of ordinary skill in the art from the following description of embodiments of the present invention, taken in conjunction with the accompanying drawings.

FIG. 1 is a mobile computing device 100 interfacing with a small charging docking station 120 that can optionally have local storage, processors, memory and other Workstation features in a compact package. By virtue of unique device identification numbers the mobile computing device 100 appropriately adapts its UI to that of the keyboard 130, mouse 150, and monitor 160 via connector 140 that interfaces with the user as a typical full featured Workstation. Wire 140 can be copper or fiber and can optionally be replaced by various forms of wireless communications from infrared to radio. To the user it is indistinguishable from a traditional Workstation; however, when the user changes the surrounding computing environment from a meeting, a phone call, or Workstation the mobile computing device can automatically adapt its UI seamlessly to what the user is accustomed. Smartphones have scaled down PDA UI that is typically used with just a touchscreen while a PC, Workstation or Server has another type of UI that is meant to be used with a mouse, keyboard and monitor. The mobile computing device has an AAUI that has the ability to adapt dynamically from any UI that a typical Smartphone, PDA, Laptop, gaming station, desktop, or Server has. It can be optionally connected to a charger, docking station or Laptop like device and seamlessly switch from one user interface to another depending on what is appropriate. Wireless mobile computing device charging can be implemented in the form of a charging/docking station, cable box, gaming console/controller, stereo system, TiVo like device, IoT device, DVR, set-top box, personal cloud device in all combinations thereof could employ the AAUI. It would also be capable of integrating with monitors, keyboards and other components typically used by a Laptop or desktop user. One method of implementing the AAUI would be to employ hypervisors or VMs that would switch from one AAUI to another depending on interfacing devices, usage or the personal desire to switch UI. Employing AAUI on hypervisors would hamper the ability to synchronize communications information between Windows Managers protocol and wouldn't be as seamless as a native Workstation OS that is capable of switching UI via Windows Managers or some facsimile thereof however it could be done in the underlying hypervisor kernel. The mobile computing device 100 also can combine the capabilities of all the devices it supports. The use of the mobile computing device disclosure 100 now dynamically adds AAUI features from the array of devices its supports to become a fully functional Workstation.

Figure 2:
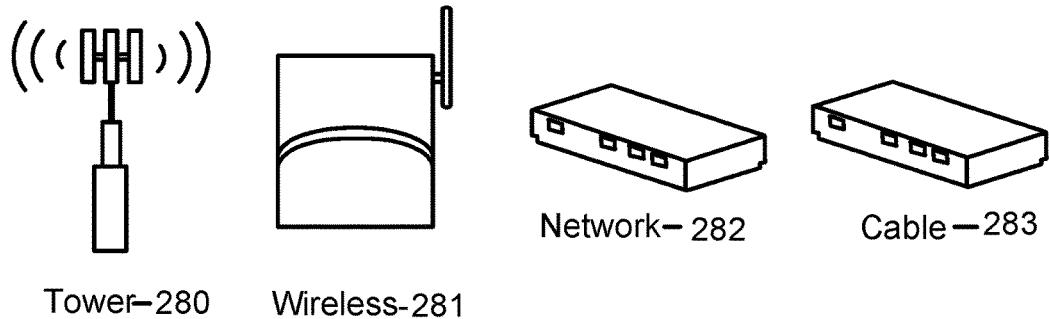
FIG. 2 illustrates an example computing device interacting with different devices at two different times and places.
Figure 2:
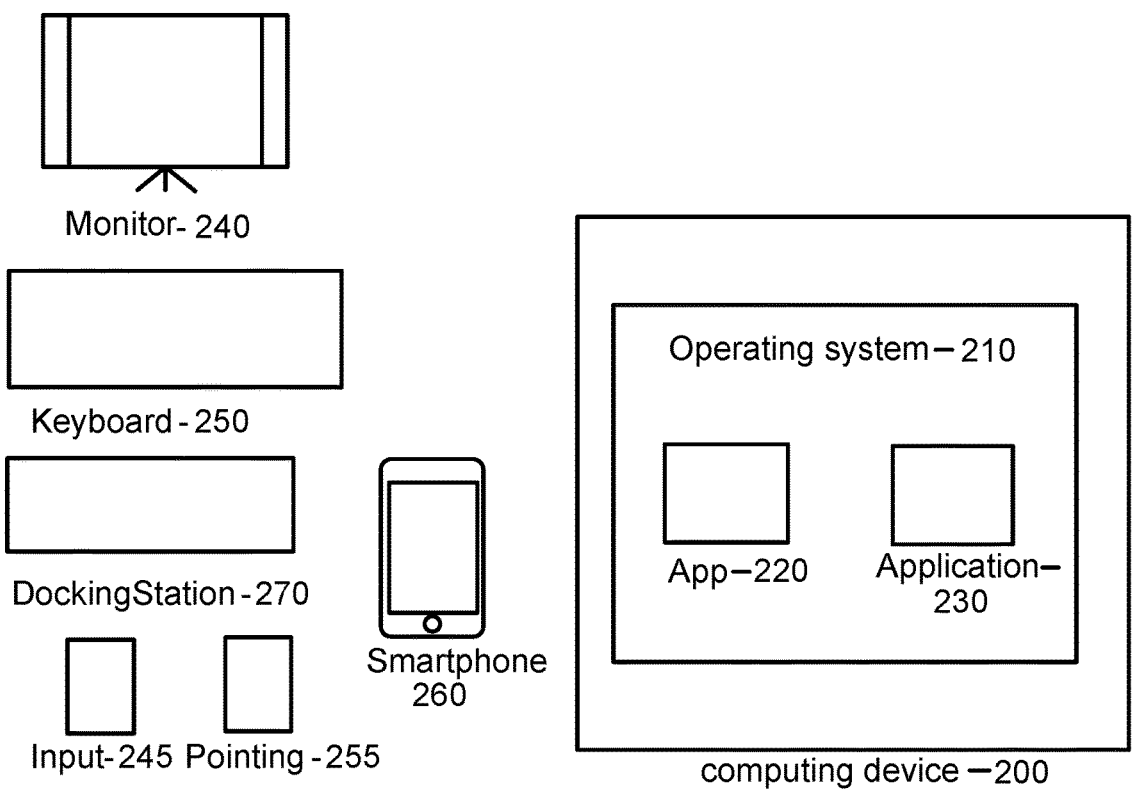
Figure 2:
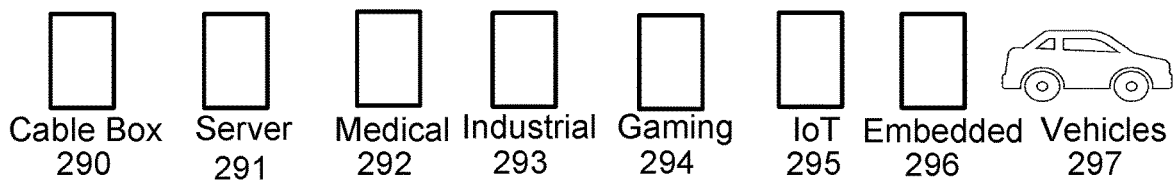

FIG. 2 shows the computing device 200 that can now be in the form of as a Smartphone 260 as well as tablet 260, a multipurpose cable box and or gaming station 290, a Server/Workstation 291 a traditional Workstation, medical device 292, Industrial application 293, Gaming device 294, IoT device 295, an embedded device 296, or even a vehicle 297 with an AAUI that runs on a full Workstation OS 210 or some facsimile thereof that can run PDA apps 220 as well as Workstation applications 230. Other Smartphone vendors have added some interface features, like adding a start button to their PDA embedded type OS, to make it appear like their full blown Workstation OS product, however, these devices can't actually run Workstation applications that have the option of dynamically switch from one user interface to another as needed. Computing device 200 with Workstation/Server OS 210 has all the user interfaces a user would want from a Smartphone, Laptop, Workstation, gaming device, medical device to an advanced Server etc. The computing device 200 can interface with a mouse or pointing input device 255, a monitor, projector, television, or monitor type device 240, keyboard device 250 and or input device (such as a game console etc.) 245. At the same time the computing device 200 that can communicate with cellular tower 280, a Wireless communication device 281, a network device 282 and a cable modem device 283. The flexibility introduced by the AAUI creates new usage opportunities that a regular Smartphone or Workstation would not have. For instance the mobile computing device 200 when being used as a Workstation present phone calls or interface with a dish type modem 283 and display a television program. The computing device 200 is capable of interfacing with multiple communication devices and protocols like 280, 281, 282 and 283 and other similar communication technologies.

When computing device 200 is a mobile computing device 100 in FIG. 1 with Workstation/Server OS 210 and can interface with a docking station 270. The computing device 200 can come in various forms ranging from a small charging station, to a full computer that is enclosed in monitor, Laptop, or more traditional full docking station. Docking station 270 can include CPU, FPGA, DSPs, SoC, AI, Storage Disk, Memory, Memristors, Fiber bus and any component that could be found in a traditional Workstation as well as any components found in HPC computers. A computing device 200 can be configured to run the AAUI to combine more than one of the devices such as a multipurpose cable box and or gaming station 290, a Server/Workstation 291 a traditional Workstation, medical device 292, Industrial application 293, Robotics 294, IoT device 295, an embedded device 296, or even a vehicle 297 into one physical device. For instance a cable box 290 can simultaneously employ the PDA interface when being used as a cable box but also be a Server/Workstation 291 as well as a gaming console, a IoT device for monitoring the home, a TiVo type device and so on all having the ability to switch from the PDA interface to a full blown native Server Workstation interface that are both augmented by an audible interface determined by how it interfaces with the devices the user is using.

Smartphones are getting so powerful that they are now capable of running full versions of an OS 210 like Linux, macOS and Windows. The a computing device 200 can run a full version of an OS that has an AAUI that allows it to replace the need for multiple devices with multiple versions of the same application tailored to each type of user interface be it a PDA, Laptop/Workstation/Server, gaming device, medical device, robotics device, integrated cable box including of a stereo system, TiVo, DVR set-top combo box, Workstation, personal cloud, gaming and VR and Holographic Augmented Reality console, IoT device controller interfacing with IoT switches and sensors and so on, all in various combinations thereof. Software for the computing device 200 can come in two categories being PDA Apps 220 and Workstation Applications 230. Apps 220 that have PDA user interfaces and Workstations Applications 230 could run natively as well as utilizing emulators. Software applications can eventually be developed to have multiple user interfaces that are employed depending on which type of devices and view category be it App UI 220 or Workstation Application UI 230 and the environment the mobile computing device 200 is in. Traditionally in Object Oriented software design the MVC (Model, View and Controller) is how applications are organized. Some vendors have a forms control based development environment. These approaches to software design isolate the presentation layer of the application that interfaces with the user. This presentation layer can be augmented to call the touchpad orientated PDA App 220 or the Workstation Application 230 UI components depending on with devices are being used with the computing device 200. Whether a gaming station, Smartphone, tablet, medical device, embedded device or Workstation the user interface API libraries can seamlessly interface with them all while running a full Workstation OS 210. Hypervisors or VM software can be employed to switch from one VM to another each with their perspective UI that is managed by the AAUI. However the preferred method would be to have a protocol that manages communication in the OS layers between the various Windows Managers that the AAUI employs. Protocols that synchronizes widget placement between Hypervisors and VMs would have to reside in the VM software and would be more difficult to implement. Having mobile computing device 200 that has a native Workstation OS 210 or facsimile thereof with an AAUI that categorizes the UI into two separate presentation layers that rely on which device ID and category to use would be more practical and perform better since it doesn't have to interface with the emulation software layer to get to the low level hardware.

Figure 3:
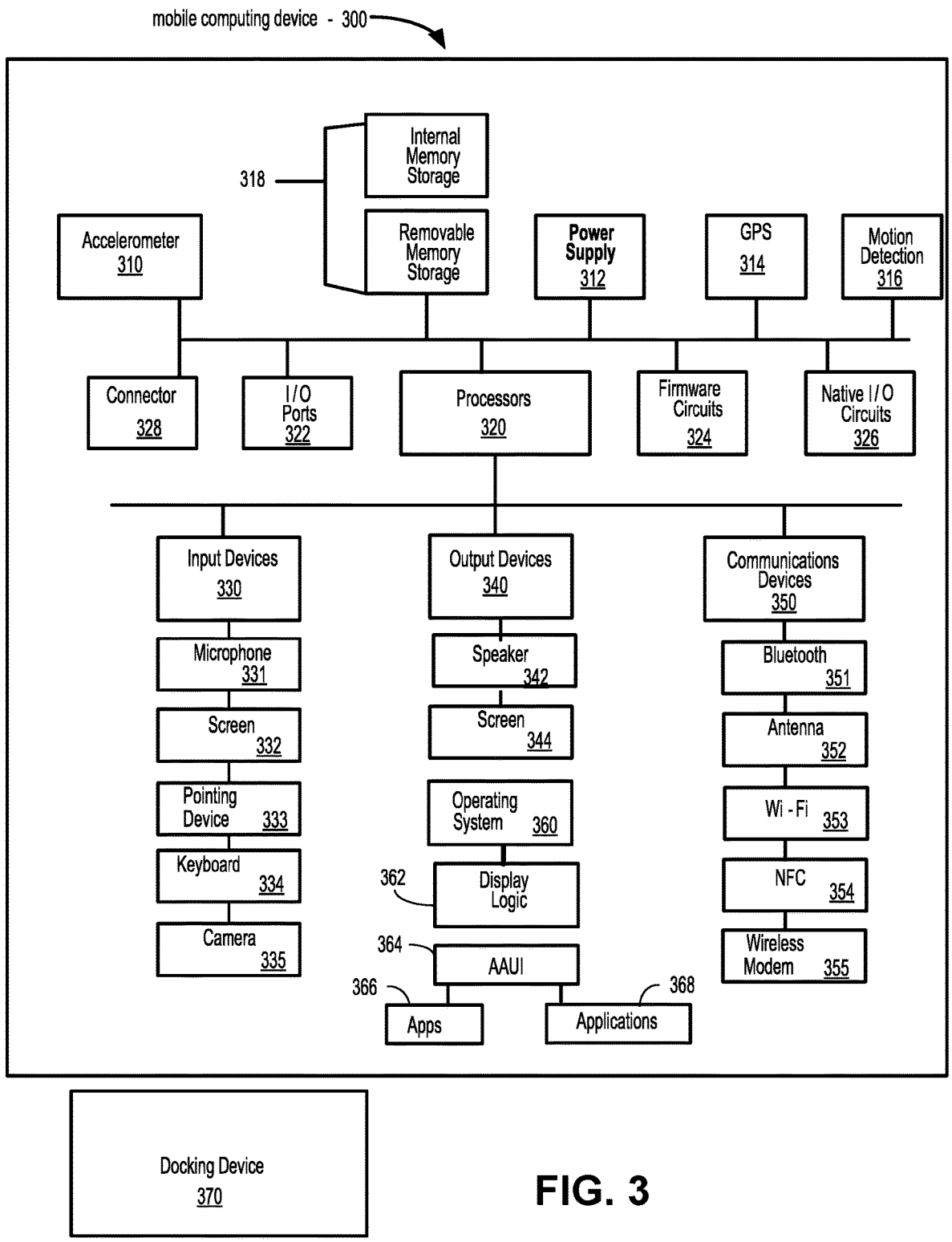
FIG. 3 illustrates components of a mobile computing device and the optional usage of various forms of a docking station.

FIG. 3 is a system diagram that details the various important hardware and software components that comprise the mobile computing device 300. The mobile computing device 300 can optionally be coupled with hardware that plays the role of a docking station 370. In the age of IoT (Internet of Things) many devices can play the role of a docking station 370 from a simple recharging station to a HPC computer. These computing devices can also take other forms as a secondary role such as monitors with built-in computers to Laptops designed to accommodate docking a smartphone. Through the use of technologies like Bluetooth the docking station 370 doesn't have to require a physical connection eventually it could employ a fiber optics I/O connection similar to the Thunderbolt technology that is currently available. Docking station 370 can contain a wide variety of sophisticated processors components 320 that usually can be found in HPC computers like FPGAs, DSPs, AI processors, Memristors and including typical processing components like CPU, coprocessors and bus, disk and memory controllers. Docking stations can also use wireless charging while functioning as computing device. The docking station can range from a simple charging device to a fully capable computing device with independently installed OS. The mobile computing device 300 can also take various forms from a typical smartphone or PDA tablet type device to an embedded specialized application device. The mobile computing device 300 shown in FIG. 3 contains storage 318 that can take various forms but usually takes the form of internal and removable Memory components.

The internal memory 318 portion can include RAM (Random Access Memory), ROM (Read Only Memory), Flash, and SSD while the removable memory can include Flash, SIM (Subscriber Identity Module) and SSD. Memory Components 318 can be used for OS 360, Display Logic 362, AAUI 364, Apps 366 and Applications 368. OS 360 can employ the use of Hypervisors or VM software.

For instance computing device PDA full or embedded OS could be installed on one VM and the full workstation OS could be installed on another and the AAUI would be able to switch, manage and synchronize between them. OS 360 utilizes native I/O circuits 326 and I/O Ports 322 along with Firmware circuits 324 to process data. The mobile computing device 300 contains components GPS 314, Accelerometer 310 and Motion Detection 316 to enhance the cellular experience. The mobile computing device 300 physically has Connector 328 that connects to a Power Supply 312 that can take various forms such as an AC/DC wall unit to another PDA device that charges the system. Mobile computing device 300 has Input Devices 330 that include a Microphone 331, Camera 335, a touch screen 332, Keyboard 334 type device and a possible pointing device 333 that can range from a mouse to a trackball and even include a gaming station joystick type device. Mobile computing device 300 has Output Devices 340 that can range from Speaker 342 and touch Screen 344. Many of the components listed can be optional and take various forms.

For instance depending on the Operating System (OS) chosen and how much of the low level OS API that is exposed, a software implementation of a Window Manager can be developed that utilizes the AAUI as a standalone product. Mobile computing device 300 has Communication devices 350 and systems that can communicate with Bluetooth 351, Wi-Fi 353, Wireless Modems 355, NFC (Near Field Communications) 354 and Cellular Antenna Network 352 that can communicate with appropriate cellular networks such as LTE, GSM, IS-95, UMTS, CDMA2000, and so forth.

A mobile computing device 300 that has an AAUI that can support touchscreen PDA Apps 366 while also supporting full Workstation keyboard, monitor and pointing device type Applications 368. With this approach, a user may carry their smartphone and desktop content from place to place on their phone and interact and sync with different components that provide I/O that is superior to what is currently available. A mobile computing device that is a form of a Smartphone that can run a full versioned OS that has an AAUI that can morph from a PDA to a desktop interface can replace multiple computing devices that have applications that are specific to each device. Having multiple consumer computing devices with separate applications and UIs when one device is capable of replacing all those saves costs, efficiency and acceptability. Now that Smartphones are powerful enough to run full versioned OS such as Linux and there are many vendors that sell kits that do so, it's only their user interface requirements that are holding them back from being the only device a typical consumer will ever need. Being able to take the Smartphone to work and use it as a full featured desktop and then take it home and use it as a Smartphone, tablet, Laptop or multipurpose cable box/personal cloud entertainment system dramatically improves flexibility while saving on having to purchase various versions of the same application like a word-processor for each device. Having one computing device that can function as a Smartphone, PDA, enhanced Workstation, enhanced entertainment center and Laptop improves the quality of life regarding cost, efficiency and versatility. The disclosure could utilize a charger/docking station, wire/wireless interface for communication and charging, Laptop dock or use Wi-Fi/Bluetooth to interface with desktop components. A dumb laptop terminal type device which is low cost can be used with the computing device can cut costs and multipurpose components in the computing device. Having a mobile computing device that can run a full featured OS or that can emulate its capabilities can be used in medical, manufacturing, robotics or anywhere where multiple user interfaces exist.

Figure 4:
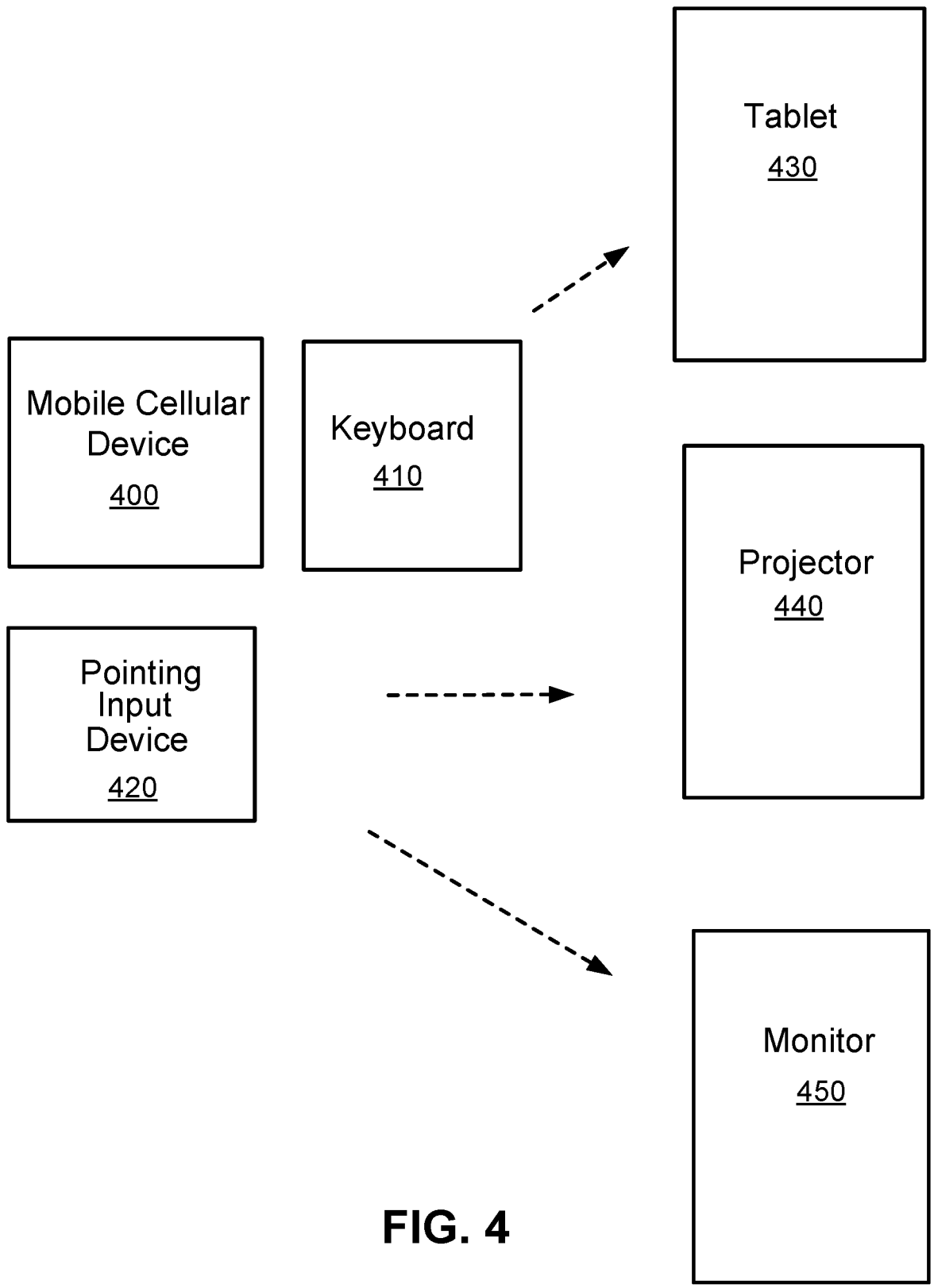
FIG. 4 illustrates the various display options that the mobile computing device has other than its own touch screen display.

FIG. 4 diagrams a Mobile Computing Device 400 AAUI (Appropriate Adaptable User Interface) options to display to various types of devices grouped into Tablet 430, the Projector 440 and the Monitor 450. The Tablet 430 presents the opportunity to be used PDA or as an accompanying monitor for the mobile computing device 400 when some form of a Keyboard 410 and Input Pointing device 420 are employed. Tablet 430, Projector 440 and Monitor 450 can optionally either display the PDA App or Workstation Application versions of the presentation layer even though the default for a Mobile Computing Device 400 when used alone is the PDA App. The Workstation application presentation layer still can be employed on the Mobile Computing Device 400 but could be awkward. Mobile Computing Device 400 would also have the option of functioning as a pointing device having the PDA App presentation layer used to direct the Workstation Application output on the Tablet 430, Projector 440 and Monitor 450 whereas any of these can be combined into one device. Projector 440 can also be a public or personal projector with some form of pointing functionality built into the AAUI. A mobile computing device in the form of a Smartphone that can run a full versioned OS that has an AAUI that can morph from a PDA to a desktop interface can replace multiple computing devices that have applications that are specific to each device. Having multiple consumer computing devices with separate applications and user interfaces when one device is capable of replacing all those saves costs, efficiency and acceptability.

Figure 5:
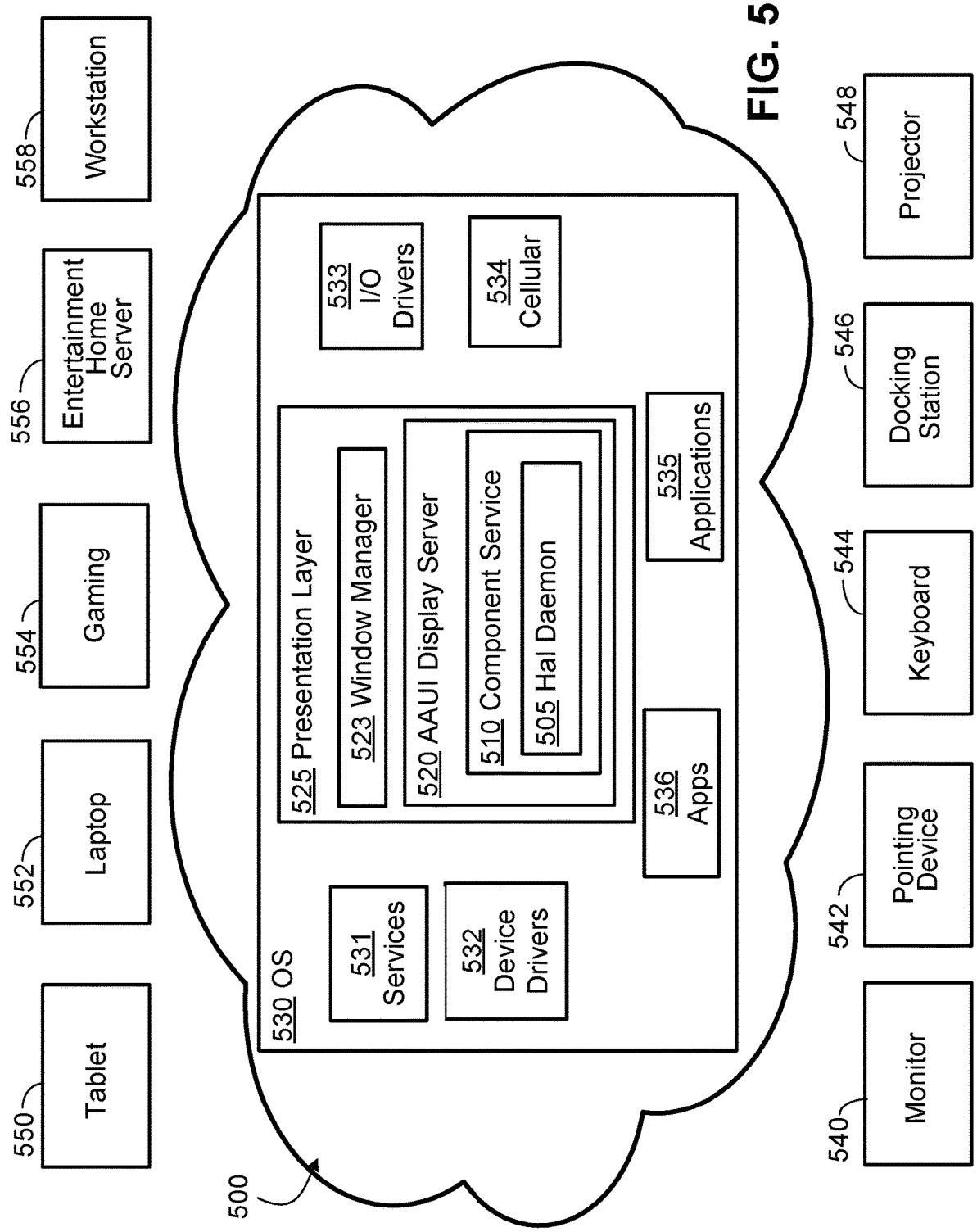
FIG. 5 diagrams the mobile computing device with an AAUI operating in a cloud environment while optionally interfacing with a keyboard and pointing device.

FIG. 5 diagrams the mobile computing device with an Operating System (OS) 530, a Presentation Layer 525 operating in a Cloud environment 500 while optionally interfacing with a keyboard and pointing device. The AAUI Display Server 520 employs Component Services 510 to detect with a handler an event sent to it by the Hardware Abstraction Layer (HAL) daemon 505 which senses a new device and installs its device driver. Cataloging and deploying device attributes concerning the proper operation in the appropriate usage in a generic manner to be used by Windows Managers 523 concerning whether a device uses a PDA App, Workstation Application, Gaming Application or some other.

Presentation Layer 525 is determined by the AAUI Display Server 520 by calling which Window Manager 523 that the Component Services 510 determines from the devices that it interfaces with. Interrupts are handled by interacting with external devices shown as a Monitor 540, Keyboard 544, a Pointing Device 542, or a Projector 548 or interacting with other computing devices such as a Tablet 550, a Laptop 552 whether it's a dumb terminal or full computing device, a Gaming Console 554, a consolidated Home Entertainment set-top 556 or a Workstation or Server 558 or combination thereof.

If the Component Services 510 determines, from handling an interrupt, that the device it's interacting with is not cataloged, the Component Services 510 can call on the Hardware Abstraction Layer (HAL) 505 to properly install the specific device driver for the new device and then return a callback to the Component Services 510 to catalog the properties, attributes and user preferences which can identity the Window Manager 523 to be assigned to new device.

The Cloud environment 500 can provide services of all types to interface with the various modes of operation of the AAUI which is determined by the Display Server 520 publically and privately. Component Services 510 can determine the unique characteristics and attributes of the particular devices and catalogs them in nonvolatile storage. Component Services 510 can also interface with the user to gather default properties and behaviors for devices and assign them to the AAUI Window Managers 523.

While communicating with the Cloud 500 the mobile computing device can act as a standalone smartphone type of a device with the appropriate PDA App UI or it can optionally employ the Workstation application UI seamlessly while connecting to a Monitor 540, Keyboard 544, a Pointing Device 542, or a Projector 548 as if it is a full featured Workstation, especially when connecting to a sophisticated Docking Station 546 that can utilize storage, memory and various types of processors ranging from FPGAs, DSPs, coprocessors, and advanced HPC Server I/O architectures. While utilizing Tablet 550 along with Keyboard 544 and Pointing Device 542 the mobile computing device functions as a full Workstation and can augment its processing power by employing a Docking Station 546 all of which can take various forms and combinations. However the mobile computing device can also be used with an appropriate smart or dumb Laptop Device 552 that is suited to take to meetings or for personal usage.

The mobile computing device can connect to other computing devices through the personal or private Cloud 500 by way of its Workstation OS 530 via Ethernet, 802.x, Wi-Fi, Cellular Communications 534 and connect to various networks through its Services 531 to process data via its various Device Drivers 532 and I/O Drivers 533 to efficiently supply either its Apps 536 or Workstation Applications 535. Being able to take the Smartphone to work and use it as a full featured desktop and then take it home and use it as a Smartphone, tablet or Laptop dramatically improves flexibility while saving on having to purchase various versions of the same application like a word-processor for each device. Having one computing device that can seamlessly function as a Smartphone, PDA, Workstation and Laptop improves the quality of life regarding cost, efficiency and versatility.

Model based frameworks, like those that stem from the original MVC Model-View-Controller architecture, are based on predetermined Widget libraries that envelope the low level GUI calls 620 to the OS kernel 610 that interfaces with the Hardware 600. Though it is not necessary to employ these frameworks most of the modern development libraries are based on some form or derivation of the original MVC architecture. Everything from Workstation application to web based browser development is loosely based on these design pattern principals so that details of the framework are not readily exposed to the everyday developer. Low level SDKs that are not implemented in an Object Oriented language still follow similar design principles if implemented in a language like C. Generally the Model is the application logic and the View is the GUI presentation and the Controller is how the framework reacts to the user Input, Outputs and manipulations. The View and Model utilize publish and subscribe protocol so that when Model data is changed, it will communicate the changes to the View. In the attempt to address the shortcoming of the original MVC architecture the MVP Model-View-Presenter in which the Presenter is responsible for interacting between the UI based View and Model which is responsible for business behaviors and state management. Typically the modern versions of MVP have evolved into the Presentation Model and the MVVM UI technologies. All of these technologies employ some form of Window Manager 650 that can be interfaced with the Display Server AAUI protocol 630 so that when the Component Services Interface 640 and App/Application Window Managers 650 interact with devices that are registered with property tables that denote the default behavior of these interfacing devices the appropriate Window Manager 650 and Widgets can be employed.

The Presentation Surface 660 therefore is capable of rendering the proper AAUI by either dynamically changing or notifying the user of the potential change managed by the Component Services 640. The OS 610 can include Hypervisor and or VM software 620 that make use of the Display Server 630. By assigning Window Managers 650 determined by the Component Service 640 and their accompanying widget libraries and skins to their appropriate devices such as pointing devices, keyboard, and touchscreen the Display Server AAUI API 630 manages the Presentation Surface Layer 660 seamlessly by switching to the desired Window Manager 630.

Web browsers usually handle Contextual User Interfaces so that they would be encompassed by the according Window Manager 650. To adapt to the encompassing array of differing vendor computing devices technologies, vendor information tables are used in web applications to be able to properly render to differing types of browser and computing device combinations. To accomplish this web apps have become generic looking from a Workstation browser to that of a Smartphone while trying to strive for a one size fits all uniform look. Even though this generic contextual one size fits all look is starting to find its way into Workstation applications the majority of Applications are better served by a UI that is tailored towards a pointing device, keyboard and monitor. The AAUI Display Manager layer 630 is capable of being employed in many various specified AUI from the touch screen PDA to gaming, to Virtual Reality, Holographic Augmented Reality, Mixed Reality, 360° video and Computer-generated VR (CG VR) devices that employ various forms of sonar to detect user movements to robotics and medical devices and so on. One could utilize a Smartphone with a full OS 610 and Frameworks, HAL API and Libraries 620 to interface with an optional docking station which can act like a personal cloud device to transform from a typical Smartphone to a Cable box, with TiVo to a gaming console to IoT and Virtual Reality, Holographic Augmented Reality, MR (mixed reality) and Computer-generated VR (CG VR) and even Natural Machines that could employ different presentation layers all in one device in all possible combinations by virtue of its Display Server 630. Smartphones can be accompanied by sensors and devices like headsets, glasses, and other wearables where processing can be offloaded to the Smartphone to enhance the experience. This would dramatically improve versatility and save costs while the AAUI 630 could also interface with IoT switches and sensors so that the Smartphone can be the only computing device that a user needs. Now that computing devices are becoming more than SoC but full blown mini HPC computers that will soon have all the capabilities of modern Adaptable Computing Machines capable of parallel and series processing (as described in COMPUTER SYSTEM AND A COMPUTER DEVICE, U.S. Pat. No. 9,135,203, incorporated herein by reference in its entirety) and home cable service is now beginning to achieve Gigabit throughput the AAUI could become a vital part of Sky Computing where user files and processing are pushed down to the user's device rather than massive cloud storage. Sky Computing encompasses indexes of its user's personal cloud content but the actual files are stored by the user. Sky Computing can alleviate the massive amounts of storage used by large websites and also allocate processing to will and able computing power of personal clouds in homes, Organizations, Businesses and Universities. Users would be able to own their files instead giving up their ownership rights to Cloud companies. Gigabit cable throughput and the new Wi-Fi 5LTE speeds combined with the ARM Big Little Chip and Adaptive Computing Chip AI technologies, Sky Computing is becoming more feasible and is enhanced by the multipurpose device AAUI technology.

Flow diagrams are illustrated methodologies that show example methods for the purpose of detailing general concepts concerning to mode of operation. The illustrated methodologies depicted as block diagrams are not limited by their order or generality. The blocks contained in generalized flow diagrams are expressed as conceptual and may represent the full implementation, but preserve the functionality of the disclosure.

Figure 6:
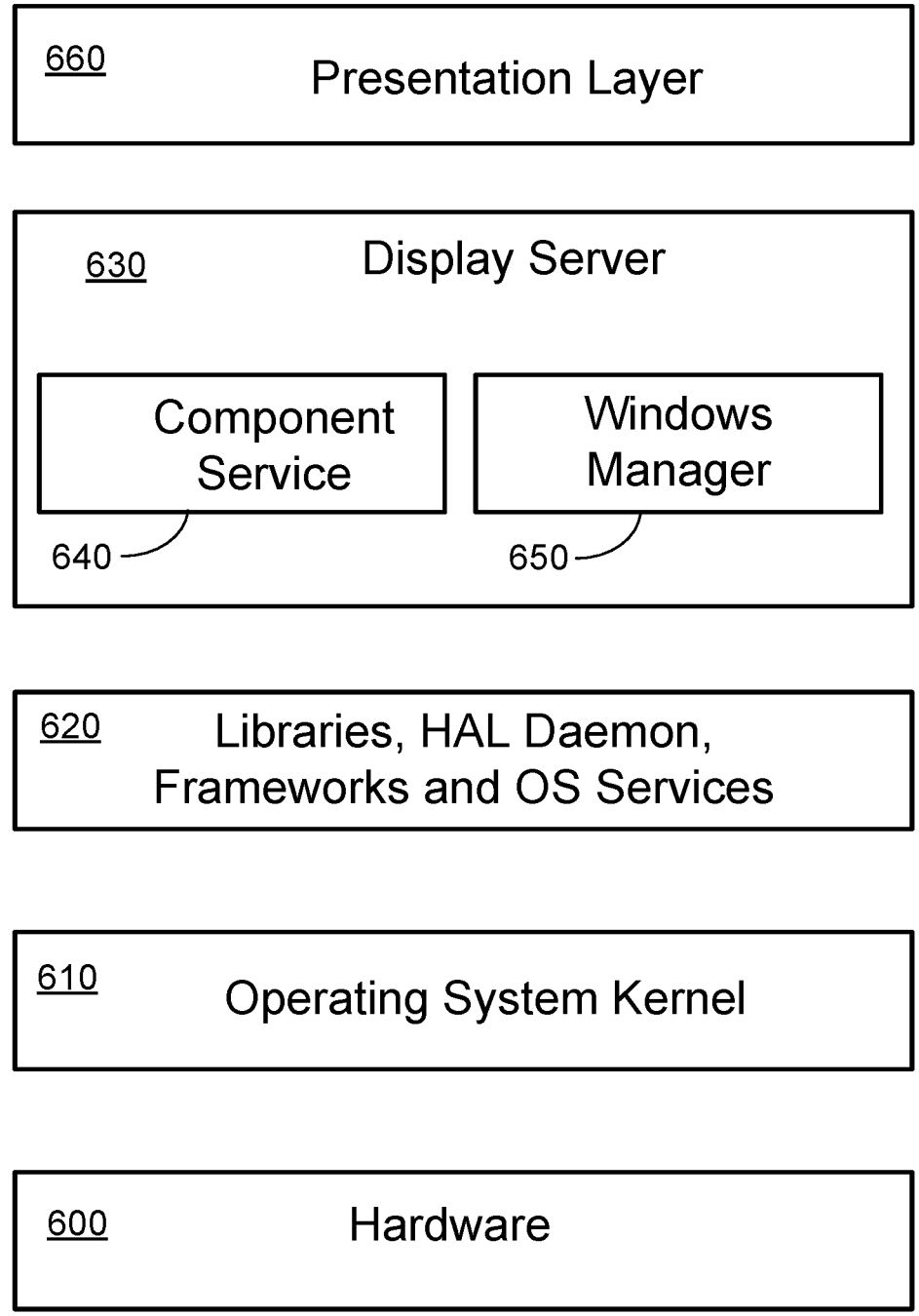
FIG. 6 illustrates a diagram showing the versatility of the use of the AAUI with various computing devices.
Figure 7:
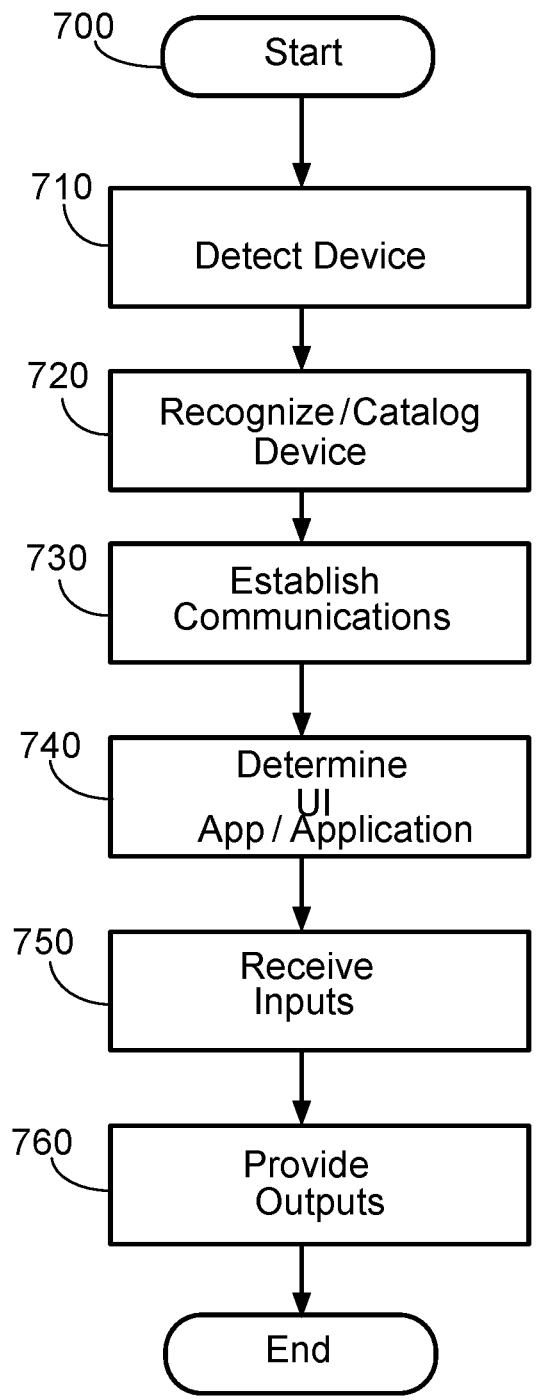
FIG. 7 illustrates a flow diagram showing the methods that the AAUI would employ to communicate with different devices and display the appropriate UI presentation for that device.

FIG. 7 shows a Flow Diagram 700 employed by a mobile computing device that utilizes component services to process data from inputs and outputs. Most computing devices use some form of a Hardware Abstraction Layer (HAL) to manage plug and play interaction with interacting with devices and their requirements to be used with the OS. The HAL represented in FIG. 6 as 620 is an integral part of the Operating System and manages device recognition, cataloging of device properties and manages the device drivers. The mobile computing device starts by Detecting Device 710 from handling an interrupt event which is triggered by communications protocol, such as Bluetooth, or a similar interaction, like interfacing with a docking station. The mobile computing device needs to determine whether the detected device is currently recognized or cataloged 720 (for example, by Component Services 640 in FIG. 6). If the mobile computing device is interfacing with the detected device for the first time or if changes have been made to the detected device. Component services 640 called by 720 can be used to detect device state events that dictate the behavior of the interaction of external devices with the computing device that the AAUI is deployed on. The interaction of the HAL 620 with the Presentation Layer 660 in FIG. 6 is defined by the Component services 640 of the Operating System that it is deployed to. As part of the Presentation Layer 660, the Display Server 630 in FIG. 6 manages the Window Manager 650 by re-parenting a generic look for applications governed by the Component Services 640. The Display Server 630 manages a universal widget that adapts to the Window Manager 650 individual aspects. If the OS has a more tightly coupled Presentation Layer with its Kernel, the AAUI would have to employ a similar Display Server to the native Presentation Layer to be able to seamlessly interface with the different Window Managers that the AAUI Presentation Surface Layer uses. The example method expressed in Flow Diagram 700 determines what Presentation Layer is appropriate by what form of AAUI (Appropriate Adaptable User Interface) Window Manager be it a PDA App or a Workstation Application once its device and usage attributes have been obtained from a notification event. Unless there is a change to what the mobile computing device has determined what AAUI in its component services is registered the mobile computing device will communicate with inputs and outputs while Establishing Communications 730. Once Establishing Communications 730 has been executed the mobile computing device determines UI 740 from the Display Server 630 to use for the appropriate Window Manager 650 to be used by the Presentation Surface 660 while receiving Inputs 750 and Outputs 760 that is dictated in the presentation layer attributes obtained from component services and logic.

A consumer could have one device that could adapt it user interface to almost any type of personal computing device that they would have to buy separately thus replacing all of them. Additionally having a mobile computing device that can run a full featured OS can be used in medical, manufacturing, robotics or anywhere where multiple user interfaces exist. Also robotics could have a simplified user interface for the shop floor while at the same time being a full featured Machine Learning Server that can streamline the manufacturing process dynamically. Medical devices can interface with doctors while interfacing with patients. At the same time the medical device could process data and use artificial intelligence to diagnose diseases while acting as a number crunching data warehousing using a form of elastic search or OLAP technology to make recommendations. Any application that can be run on a Workstation could in effect now be run on a Smartphone as long it employs an adaptable user interface. Smartphone today now are as powerful as or more so than many PCs. It is not uncommon to find Smartphone with storage and memory like a PC would have. Some Smartphone come with as much as 8 GBS of memory and more than enough storage to be a PC.

The mobile computing device could interface with a docking station that uses a Workstation user interface or dock less station that uses a Bluetooth type connection to then switch to a Smartphone that uses a Smartphone PDA interface that both access the same suite of applications, not one version of an application for each user interface. In effect any consumer computing device from a Smartphone, tablet, PDA, gaming system, TV cable box/satellite channel recording device, and Workstation and so on can be accessed by one device with an adaptable user interface. Any consumer computing device found in the home or office can all be consolidated.

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry (e.g., an FPGA (field programmable gate array) or an ASIC (application-specific integrated circuit)). In addition to hardware, the apparatus can optionally include code that creates an execution environment for computer programs (e.g., code that constitutes processor firmware, a protocol stack, a database management system, an operating system, or a combination of one or more of them).

A computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, sub-programs, or portions of code)). A computer program can be deployed so that the program is executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), to name just a few).

Computer-readable media suitable for storing computer program instructions and data include all forms of non-volatile memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user, for example, by sending web pages to a web browser on a user's device in response to requests received from the web browser.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device), which acts as a client. Data generated at the user device (e.g., a result of the user interaction) can be received from the user device at the server.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A handheld computing device comprising:
   at least one processor; and
   a memory, wherein the memory includes instructions that causes the at least one processor to perform operations comprising:
      detecting at least one device connected to the handheld computing device, the at least one device being a least one of a pointing device, a keyboard, and an external display;
      selecting a presentation layer from a plurality of different presentation layers of virtual machines based on the detecting of the at least one device, the plurality of different presentation layers comprises at least a smartphone presentation layer that is selected when the handheld computing device is solely used as a smartphone and a workstation presentation layer that is selected when the handheld computing device is solely used as a workstation in conjunction with the detected device; and
      displaying the selected presentation layer on a display associated with the handheld computing device, wherein the selected presentation layer is presented by a smartphone presentation layer display manager interfacing with an operating system of one virtual machine of the virtual machines when the selected presentation layer is the smartphone presentation layer, and the selected presentation layer is presented by a workstation presentation layer display manager interfacing with the same or another operating system of another one of the virtual machines when the selected presentation layer is the workstation presentation layer.

2. The handheld computing device of claim 1, wherein the plurality of different presentation layers includes at least a PDA type presentation layer.

3. The handheld computing device of claim 1, wherein the detecting and selecting are performed by an adaptive presentation layer display manager.

4. The handheld computing device of claim 1, wherein the at least one device is at least one of a mouse, a monitor, a projector, a television, a monitor type device, a game controller, and an input device.

5. The handheld computing device of claim 1 further comprising:
a data store, the data store storing records identifying devices and corresponding presentation layers; and
wherein selecting the presentation layer comprises accessing the data store.

6. A handheld computing device implemented method comprising:
   detecting at least one device connected to the handheld computing device, the at least one device being a least one of a pointing device, a keyboard, and an external display;
   selecting a presentation layer from a plurality of different presentation layers of virtual machines based on the detecting of the at least one device, the plurality of different presentation layers comprises at least a smartphone presentation layer that is selected when the handheld computing device is solely used as a smartphone and a workstation presentation layer that is selected when the handheld computing device is solely used as a workstation in conjunction with the detected device; and
   displaying the selected presentation layer on a display associated with the handheld computing device, wherein the selected presentation layer is presented by a smartphone presentation layer display manager interfacing with an operating system of one virtual machine of the virtual machines when the selected presentation layer is the smartphone presentation layer, and the selected presentation layer is presented by a workstation presentation layer display manager interfacing with the same or another operating system of another one of the virtual machines when the selected presentation layer is the workstation presentation layer.

7. The handheld computing device implemented method of claim 6, wherein the plurality of presentation layers includes at least a PDA type presentation layer.

8. The handheld computing device implemented method of claim 6, wherein the detecting and selecting are performed by an adaptive presentation layer display manager.

9. The handheld computing device implemented method of claim 6, wherein the at least one device is at least one of a mouse, a monitor, a projector, a television, a monitor type device, a game controller, and an input device.

10. The handheld computing device implemented method of claim 6, wherein selecting the presentation layer comprises accessing a data store, the data store storing records identifying devices and corresponding presentation layers.

11. A non-transitory computer readable medium storing instructions that when executed cause a processor to perform operations comprising:
   detecting at least one device connected to a handheld computing device, the at least one device being a least one of a pointing device, a keyboard, and an external display;
   selecting a presentation layer from a plurality of different presentation layers of virtual machines based on the detecting of the at least one device, the plurality of different presentation layers comprises at least a smartphone presentation layer that is selected when the handheld computing device is solely used as a smartphone and a workstation presentation layer that is selected when the handheld computing device is solely used as a workstation in conjunction with the detected device; and
   displaying the selected presentation layer on a display associated with the handheld computing device, wherein the selected presentation layer is presented by a smartphone presentation layer display manager interfacing with an operating system of one virtual machine of the virtual machines when the selected presentation layer is the smartphone presentation layer, and the selected presentation layer is presented by a workstation presentation layer display manager interfacing with the same or another operating system of another one of the virtual machines when the selected presentation layer is the workstation presentation layer.

12. The non-transitory computer readable medium of claim 11, wherein the plurality of presentation layers includes at least a PDA type presentation layer.

13. The non-transitory computer readable medium of claim 11, wherein the detecting and selecting are performed by an adaptive presentation layer display manager.

14. The non-transitory computer readable medium of claim 11, wherein the at least one device is at least one of a mouse, a monitor, a projector, a television, a monitor type device, a game controller, and an input device.

15. The non-transitory computer readable medium of claim 11 wherein selecting the presentation layer comprises accessing a data store, the data store storing records identifying devices and corresponding presentation layer.

\* \* \* \* \*